United States Patent
Gao et al.

(10) Patent No.: US 10,218,746 B2
(45) Date of Patent: Feb. 26, 2019

(54) CALL TRANSFERRING METHOD AND DEVICE FOR MULTI-CHANNEL TERMINAL

(71) Applicant: SPREADTRUM COMMUNICATIONS (SHANGHAI) CO., LTD., Zhangjiang, Shanghai (CN)

(72) Inventors: Xichun Gao, Shanghai (CN); Xianliang Chen, Shanghai (CN); Jinjin Ni, Shanghai (CN); Yi He, Shanghai (CN); Yiguo Zhao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/810,664

(22) Filed: Nov. 13, 2017

(65) Prior Publication Data
US 2018/0139245 A1    May 17, 2018

(30) Foreign Application Priority Data
Nov. 14, 2016   (CN) .......................... 2016 1 1000730

(51) Int. Cl.
*H04M 3/58* (2006.01)
*H04L 29/06* (2006.01)
*H04M 3/428* (2006.01)

(52) U.S. Cl.
CPC ...... *H04L 65/1059* (2013.01); *H04L 65/1016* (2013.01); *H04L 65/1083* (2013.01); *H04L 65/1096* (2013.01); *H04M 3/4288* (2013.01); *H04M 3/58* (2013.01)

(58) Field of Classification Search
CPC ............. H04L 65/1059; H04L 65/1096; H04L 65/1016; H04M 3/58; H04M 3/4288
See application file for complete search history.

(56) References Cited

U.S. PATENT DOCUMENTS

| | | | | |
|---|---|---|---|---|
| 5,422,942 A * | 6/1995 | Kakwashima | ........ | H04M 1/006 370/259 |
| 7,102,663 B2 * | 9/2006 | Crook | ............... | H04L 29/06027 348/14.01 |
| 8,307,049 B2 * | 11/2012 | Peng | ..................... | H04N 21/643 709/219 |
| 2013/0293666 A1 * | 11/2013 | Jiang | ........................ | H04N 7/15 348/14.08 |
| 2014/0120925 A1 * | 5/2014 | Kanthala | ............... | H04W 72/04 455/450 |
| 2015/0171909 A1 * | 6/2015 | Gao | ..................... | H04B 1/3816 455/558 |
| 2016/0373583 A1 * | 12/2016 | Celinski | .................. | G06F 3/162 |

* cited by examiner

*Primary Examiner* — Brandon J Miller
(74) *Attorney, Agent, or Firm* — Cantor Colburn LLP

(57) ABSTRACT

Call transferring method and device for a multi-channel terminal are provided. The method includes: receiving an incoming call request from a first remote subscriber and setting up a call with the first remote subscriber based on a first service channel; and connecting the first service channel with a second service channel to forward service data of the first remote subscriber to a second remote subscriber and forward service data of the second remote subscriber to the first remote subscriber through the first and second service channels, wherein the first and second service channels are set up based on a current subscriber identity card. The method and device may improve flexibility of call transferring.

18 Claims, 2 Drawing Sheets

CALL TRANSFERRING METHOD AND DEVICE FOR MULTI-CHANNEL TERMINAL

CROSS-REFERENCE TO RELATED APPLICATIONS

This present application claims the benefit of priority under 35 U.S.C. § 119 to Chinese patent application No. 201611000730.7, filed on Nov. 14, 2016, and the entire disclosure of which is incorporated herein by reference.

TECHNICAL FIELD

The present disclosure generally relates to communication field, and more particularly, to call transferring method and device for a multi-channel terminal.

BACKGROUND

With the continuous improvement of mobile network bandwidth and continuous optimization of upload and download rates, currently, calls of mobile terminals mainly include a variety of traditional related service based on data, such as voice call or video call.

Existing call control policies for mobile terminals can only keep one call in an activated state. If a current subscriber has an incoming call request from a third party subscriber, the existing mobile terminals cannot do any processing, and only a network can perform call waiting or call forwarding. And call forwarding only occurs in a few fixed scenes, such as busy to forward or no response to forward. Besides, once a target subscriber is set for call forwarding, the target subscriber cannot be dynamically adjusted in the forwarding process, which is not flexible enough to seriously affect subscriber's operating experience.

SUMMARY

In embodiments of the present disclosure, call transferring may be more flexible.

In an embodiment of the present disclosure, a call transferring method for a multi-channel terminal is provided, including: receiving an incoming call request from a first remote subscriber and setting up a call with the first remote subscriber based on a first service channel; and connecting the first service channel with a second service channel to forward service data of the first remote subscriber to a second remote subscriber and forward service data of the second remote subscriber to the first remote subscriber through the first and second service channels, wherein the first and second service channels are set up based on a current subscriber identity card.

Optionally, prior to receiving an incoming call request from a first remote subscriber, the method may further include: a current subscriber being in a call with a third remote subscriber using a third service channel, wherein the third service channel is set up based on the current subscriber identity card which identifies the current subscriber.

Optionally, the method may further include: releasing the connection between the first service channel and the second service channel based on an instruction of the current subscriber; and setting up a call between a current subscriber and the first or second remote subscriber, wherein the current subscriber identity card identifies the current subscriber.

Optionally, prior to connecting the first service channel with a second service channel, the method may further include: setting up a call with the second remote subscriber based on the second service channel.

Optionally, the second remote subscriber may be determined based on a selection of the current subscriber.

Optionally, the service may be based on an IP Multimedia Subsystem (IMS) network.

Optionally, the service may include voice service or video service.

Optionally, the service may include VoLTE service or VoWiFi service.

Optionally, when the first service channel is connected with the second service channel, the third service channel may retain an activated state.

Optionally, the first, second and third service channels may perform service data transmission based on a data channel which is set up based on a wireless network.

Optionally, the data channel for the first, second and third service channels may be a data channel of an IMS network.

Optionally, the data channel of the IMS network may include a data channel corresponding to IMS Public Data Network (PDN).

Optionally, the first, second and third service channels correspond to different ports of the data channel.

Optionally, the method may further include: releasing the connection between the first service channel and the second service channel based on an instruction of the current subscriber; and connecting the first service channel with a fourth service channel to set up a call between the first remote subscriber and a fourth remote subscriber through the first and fourth service channels, wherein the fourth service channel is set up based on the current subscriber identity card.

In an embodiment of the present disclosure, a call transferring device for a multi-channel terminal is provided, including: an incoming call request receiving circuitry configured to receive an incoming call request from a first remote subscriber and set up a call with the first remote subscriber based on a first service channel; and a service channel connecting circuitry configured to connect the first service channel with a second service channel to forward service data of the first remote subscriber to a second remote subscriber and forward service data of the second remote subscriber to the first remote subscriber through the first and second service channels, wherein the first and second service channels are set up based on a current subscriber identity card.

Optionally, the device may further include: a parallel calling circuitry configured to control a current subscriber to be in a call with a third remote subscriber using a third service channel, wherein the incoming call request receiving circuitry is configured to receive the incoming call request from the first remote subscriber when the current subscriber is in the call using the third service channel, and the third service channel is set up based on the current subscriber identity card which identifies the current subscriber.

Optionally, the device may further include: a releasing circuitry configured to release the connection between the first service channel and the second service channel based on an instruction of the current subscriber; and a current subscriber calling circuitry configured to set up a call between a current subscriber and the first or second remote subscriber, wherein the current subscriber identity card identifies the current subscriber.

Optionally, the device may further include a call setting up circuitry configured to: before the first service channel and the second service channel are connected, set up a call with the second remote subscriber based on the second service channel.

Optionally, the call setting up circuitry may be configured to determine the second remote subscriber based on a selection of the current subscriber.

Optionally, the service may be based on an IMS network.

Optionally, the service may include voice service or video service.

Optionally, the service may include VoLTE service or VoWiFi service.

Optionally, when the first service channel is connected with the second service channel, the third service channel may retain an activated state.

Optionally, the first, second and third service channels may perform service data transmission based on a data channel which is set up based on a wireless network.

Optionally, the data channel for the first, second and third service channels may be a data channel of an IMS network.

Optionally, the data channel of the IMS network may include a data channel corresponding to IMS PDN.

Optionally, the first, second and third service channels may correspond to different ports of the data channel.

Optionally, the device may further include: a releasing circuitry configured to release the connection between the first service channel and the second service channel based on an instruction of the current subscriber; and a call switching circuitry configured to connect the first service channel with a fourth service channel to set up a call between the first remote subscriber and a fourth remote subscriber through the first and fourth service channels, wherein the fourth service channel is set up based on the current subscriber identity card.

Embodiments of the present disclosure may provide following advantages. By configuring a first service channel, a current subscriber is enabled to receive an incoming call request from a first remote subscriber and set up a call with the first remote subscriber. By connecting the first service channel with a second service channel, service data of the first remote subscriber and a second remote subscriber can be forwarded under the control of the current subscriber. In this way, call transferring is realized without relying on related settings at a network, which improves flexibility of call transferring.

Further, before the first service channel and the second service channel are connected, a call is set up with the second remote subscriber based on the second service channel. In this way, the current subscriber may select a transferring object for the incoming call request from the first remote subscriber according to practical requirements, i.e., the second remote subscriber, which may further improve flexibility of call transferring.

DETAILED DESCRIPTION

As described in the background, the existing call control policies for mobile terminals can only keep one call in an activated state. If a current subscriber has an incoming call request from a third party subscriber, the existing mobile terminals cannot do any processing, and only call waiting or call forwarding can be performed through a network. Specifically, a condition of triggering forwarding and a target subscriber are predetermined at a network. When a call meets the condition, the call is forwarded to the target subscriber. Therefore, the existing mobile terminals cannot forward calls, and only the network can perform call waiting or call forwarding, which is not flexible enough to seriously affect subscriber's operating experience.

In embodiments of the present disclosure, by configuring a first service channel, a current subscriber is enabled to receive an incoming call request from a first remote subscriber and set up a call with the first remote subscriber. By connecting the first service channel with a second service channel, service data of the first remote subscriber and a second remote subscriber can be forwarded under the control of the current subscriber. In this way, call transferring is realized without relying on related settings at a network, which improves flexibility of call transferring.

In order to clarify the object, solutions and advantages of embodiments of the present disclosure, embodiments of present disclosure will be described clearly in detail in conjunction with accompanying drawings.

Figure 1:
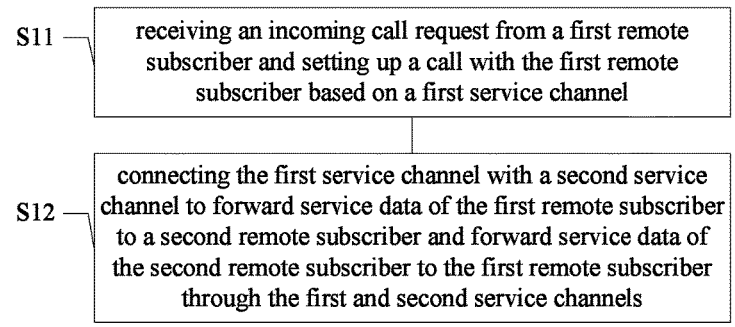
FIG. 1 schematically illustrates a flow chart of a call transferring method for a multi-channel terminal according to an embodiment.

FIG. 1 schematically illustrates a flow chart of a call transferring method for a multi-channel terminal according to an embodiment. The method may include:

S11, receiving an incoming call request from a first remote subscriber and setting up a call with the first remote subscriber based on a first service channel; and S12, connecting the first service channel with a second service channel to forward service data of the first remote subscriber to a second remote subscriber and forward service data of the second remote subscriber to the first remote subscriber through the first and second service channels.

The first and second service channels are set up based on a current subscriber identity card. The service channel may include a channel for transmitting service data, such as voice or video, and be used for processing service, such as voice service or video service. The service may be based on an IMS network, such as VoLTE service or VoWiFi service. Further, the call may include voice call or video call. More embodiments may be obtained by those skilled in the art according to practical requirements, and are not described in detail here. Further, call means transmitting service data in a service channel.

In the existing techniques, call forwarding is performed when a terminal only receives an incoming call request without setting up a call. However, in embodiments of the present disclosure, call transferring is performed after a terminal responds to an incoming call request and a call has been set up. By connecting the first service channel with the second service channel, a channel for service data transmission between the first remote subscriber and the second remote subscriber is set up through the multi-channel terminal, so that service data of the first remote subscriber can be forwarded to the second remote subscriber and service data of the second remote subscriber can be forwarded to the first remote subscriber, which realizes call transferring.

Besides, call transferring after the call has been set up does not rely on a network, and may provide more selections to the current subscriber. The current subscriber may select to listen or perform call transferring. Therefore, the call transferring method in embodiments of the present disclosure may be more flexible and lead to better user experience.

In some embodiments, prior to receiving the incoming call request from the first remote subscriber, the current subscriber may be in a call with a third remote subscriber using a third service channel, wherein the third service channel is set up based on the current subscriber identity card which identifies the current subscriber. Connecting the first service channel with the second service channel and being in the call using the third service channel may be independent from each other.

Before transferring the incoming call request of the first remote subscriber, the current subscriber may be listening to other call. As connecting the first service channel with the second service channel is independent from being in the call using the third service channel, the current subscriber may perform call transferring to the second remote subscriber without affecting listening to other calls.

The current subscriber may be a subscriber identified by the subscriber identity card (such as an SIM card in a 4G terminal).

In the existing techniques, a terminal sets up only one-channel service channel for one subscriber identity card, where the service channel is set up based on a wireless network between the terminal and a network. A subscriber can, based on the service channel, interact with and be in a call with a remote subscriber which transmits a call request. The terminal can, based on the service channel, only keep a call with one remote subscriber in an activated state at one time point. Those skilled in the art can understand that, the activated state means a state where service data can be transmitted in the service channel.

Therefore, when a current subscriber is in a call with a remote subscriber, if an incoming call request is received by the current subscriber from a third party, the call with the remote subscriber must be continued and the incoming call request from the third party is retained, or the call with the remote subscriber is suspended to start a call with the third party, or call transferring is performed. In the existing techniques, call forwarding relies on the network, thus the current subscriber cannot flexibly select whether to perform call forwarding or how to perform call forwarding based on the incoming call request.

In embodiments of the present disclosure, the current subscriber may receive the incoming call request from the first remote subscriber and set up a call through the first service channel, where both the third service channel and the first service channel are in the activated state.

The current subscriber may receive the incoming call request from the first remote subscriber and further obtain information of the first remote subscriber. Further, the current subscriber may make a decision to the incoming call request from the first remote subscriber, to reject the call quest, or, set up a call with the first remote subscriber based on a first service channel and connect the first service channel with a second service channel to forward service data of the first remote subscriber to a second remote subscriber and forward service data of the second remote subscriber to the first remote subscriber through the first and second service channels, so that a call between the first remote subscriber and the second remote subscriber is formed to realize call transferring.

Different from determining the condition of triggering call forwarding and the target subscriber in the existing techniques, the call transferring method in embodiments of the present disclosure is performed under the control of the current subscriber based on a selection of the current subscriber. Therefore, flexibility of call transferring and user experience may be improved.

In some embodiments, service subjected to the call transferring may include voice service or video service, such as service of an IMS network. In some embodiments, service subjected to the call transferring may include VoLTE service or VoWiFi service.

In some embodiments, prior to connecting the first service channel with the second service channel, the method may further include: setting up a call with the second remote subscriber based on the second service channel.

In some embodiments, the first, second and third service channels may perform service data transmission based on a data channel which is set up based on a wireless network. In some embodiments, the data channel may be a data channel of an IMS network.

The wireless network may include 5G, 4G, 3G, 2G or WiFi network. The data channel may be a channel used for transmitting data under various service types. For example, for VoLTE or VoWiFi service, the data channel may be a data channel corresponding to IMS PDN.

Those skilled in the art can understand that, the first service channel, the second service channel and the third service channel can be used for setting up a call between the current subscriber and other unspecific subscribers.

That is, both the first remote subscriber and the second remote subscriber may be unspecific subscribers. The subscriber transmitting the incoming call request to the current subscriber is the first remote subscriber, and the second remote subscriber may be determined based on the current subscriber. For example, the second remote subscriber may be determined based on a demand of the first remote subscriber after the current subscriber receives the incoming call request from the first remote subscriber.

Therefore, the current subscriber may flexibly determine the second remote subscriber, i.e., a target subscriber of call transferring. The call transferring method for the multi-channel terminal provided in embodiments of the present disclosure has higher flexibility and leads to better user experience.

In some embodiments, when the first service channel is connected with the second service channel, the third service channel may still retain an activated state. In this way, when the current subscriber is in a call using the third service channel, it is possible to perform call transferring to transfer call from the first remote subscriber to the second remote subscriber.

Figure 2:
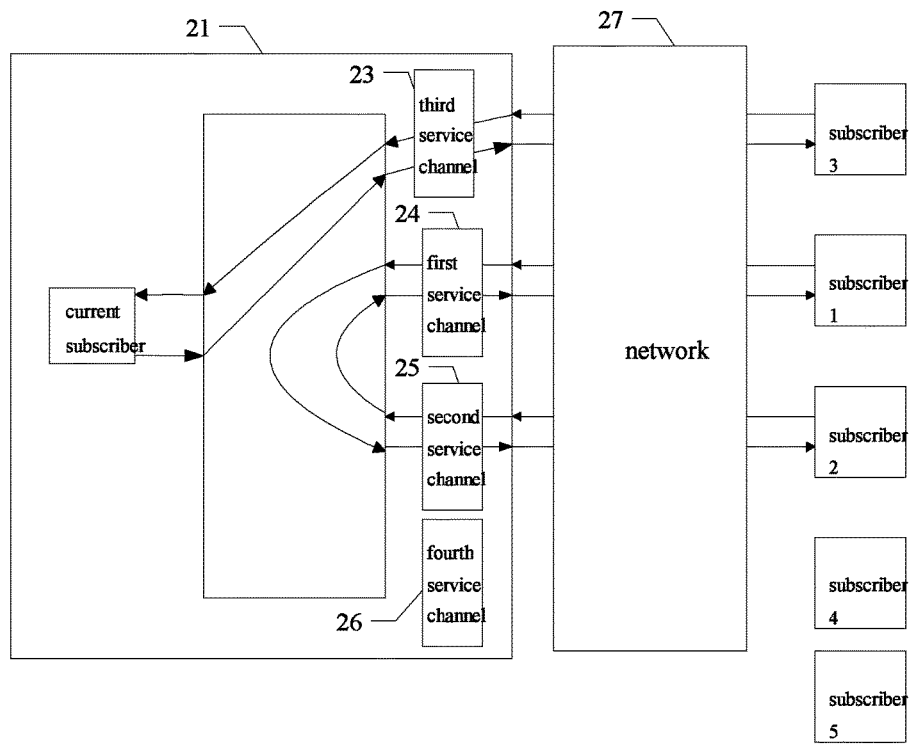
FIG. 2 schematically illustrates an application scene diagram of a call transferring method for a multi-channel terminal according to an embodiment.

To more easily understand the solutions, further description is made in conjunction with FIG. 2.

FIG. 2 schematically illustrates an application scene diagram of a call transferring method for a multi-channel terminal according to an embodiment.

A current subscriber is in a call with a subscriber 3 based on a third service channel 23 using a terminal 21. A subscriber 1 as a first remote subscriber transmits an incoming call request to the current subscriber, and the terminal sets up a call with the subscriber 1 based on a first service channel 24.

The current subscriber may select a subscriber 2 as a second remote subscriber through a human-computer interaction device of the terminal 21, and sets up a call with the subscriber 2 based on a second service channel 25.

Further, the first service channel 24 and the second service channel 25 are connected to forward service data of the subscriber 1 to the subscriber 2 and forward service data of the subscriber 2 to the subscriber 1 through the first and second service channels 24 and 25, so that a call between the subscriber 1 and the subscriber 2 is formed to realize call transferring.

From above, a call from the subscriber 1 can be transferred to the subscriber 2.

A call between the current subscriber and other subscribers may be set up through a network 27. The network 27 may include a wireless network for providing service to the terminal 21. The wireless network may be realized through a public mobile communication network, such as 5G, 4G, 3G or GPRS network, or may be a wireless local area network (for example, WiFi). Those skilled in the art can understand that, a network using a radio wave as a transmission medium can serve as the wireless network in embodiments of the present invention, and is not described in detail here.

Each service channel set up between the terminal 21 and each remote subscriber may be based on an IMS PDN based data channel which is set up by the terminal 21. In some embodiments, the terminal 21 may release the connection between the first service channel 24 and the second service channel 25, and set up a call between the current subscriber and the subscriber 1 or the subscriber 2. That is, the current subscriber may select to be in a call with the subscriber 1 or 2 after the call of the subscriber 1 is transferred to the subscriber 2.

Figure 3:
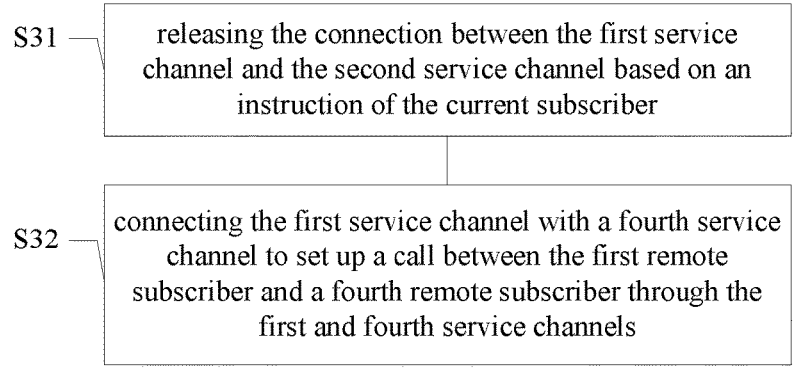
FIG. 3 schematically illustrates a partial flow chart of a call transferring method for a multi-channel terminal according to an embodiment.

Referring to FIG. 3, the call transferring method for the multi-channel terminal may further include:

S31, releasing the connection between the first service channel and the second service channel based on an instruction of the current subscriber; and S32, connecting the first service channel with a fourth service channel to set up a call between the first remote subscriber and a fourth remote subscriber through the first and fourth service channels.

Similar with the first, second and third service channels, the fourth service channel is set up based on the current subscriber identity card. Service data may be transmitted based on the data channel. For example, service data may be transmitted using a data channel of an IMS network. The data channel may include a channel corresponding to IMS PDN.

In some embodiments, the fourth service channel may be set up after the current subscriber determines the fourth remote subscriber. After the fourth service channel is set up, the first service channel and the fourth service channel are connected, so that a call can be set up between the first remote subscriber and the fourth remote subscriber. The terminal 21 may set up the call between the second service channel and the fourth service channel. That is, the terminal 21 may set up a connection between any two remote subscribers to enable a call between the any two remote subscribers.

A detailed implementation of steps shown in FIG. 3 is further described in conjunction with FIG. 2.

Still take the above scene for example. After the call of the subscriber 1 is transferred to the subscriber 2, the current subscriber can determine a subscriber 4 as the fourth remote subscriber, and sets up a connection with the subscriber 4 through a fourth service channel 26. Similar with the first, second and third service channels, the fourth service channel 26 may perform service data transmission based on a data channel. Afterwards, the first service channel 24 and the fourth service channel 26 are connected, and the connection between the first service channel 24 and the second service channel 25 is released, so that a call can be set up between the subscriber 1 and the subscriber 4 through the first service channel 24 and the fourth service channel 26.

It could be understood that, in some embodiments, after the call between the subscriber 1 and the subscriber 4 is set up, a new subscriber may be selected. For example, a subscriber 5 may set up a call between the subscriber 1 and the subscriber 5, and the connection between the subscriber 1 and the subscriber 4 is released.

The current subscriber may release the connection between the subscriber 1 and the subscriber 2 and set up a call with the subscriber 1 after terminating the call with the subscriber 3.

In embodiments of the present disclosure, the current subscriber may flexibly control the call transferring. The current subscriber may select a target subscriber for call transferring, such as the second remote subscriber, or reselect a target subscriber for call transferring after one call transferring, such as the fourth remote subscriber. Therefore, the call transferring method is relatively flexible and may meet various requirements of subscribers.

Figure 4:
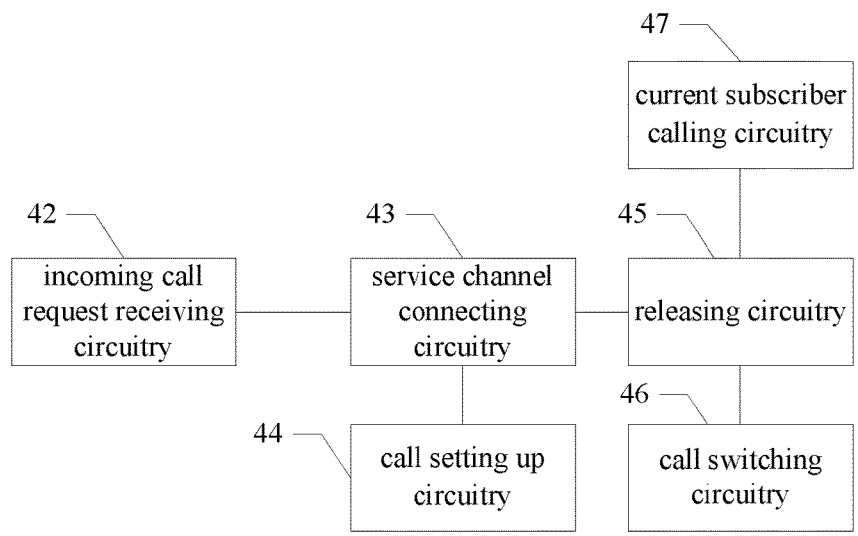
FIG. 4 schematically illustrates a structural diagram of a call transferring device for a multi-channel terminal according to an embodiment.

Referring to FIG. 4, in an embodiment of the present disclosure, a call transferring device for a multi-channel terminal is provided, including: an incoming call request receiving circuitry 42 configured to receive an incoming call request from a first remote subscriber and set up a call with the first remote subscriber based on a first service channel; and a service channel connecting circuitry 43 configured to connect the first service channel with a second service channel to forward service data of the first remote subscriber to a second remote subscriber and forward service data of the second remote subscriber to the first remote subscriber through the first and second service channels, wherein the first and second service channels are set up based on a current subscriber identity card.

The service channel may include a channel for transmitting service data, such as voice or video, and be used for processing service, such as voice service or video service. The service may be based on an IMS network, such as VoLTE service or VoWiFi service. Further, the call may include voice call or video call. More embodiments may be obtained by those skilled in the art according to practical requirements, and are not described in detail here.

In some embodiments, the device may further include: a parallel calling circuitry configured to control a current subscriber to be in a call with a third remote subscriber using a third service channel, wherein the incoming call request receiving circuitry 42 is configured to receive the incoming call request from the first remote subscriber when the current subscriber is in the call using the third service channel, and the third service channel is set up based on the current subscriber identity card which identifies the current subscriber. Connecting the first service channel with the second service channel is independent from being in the call using the third service channel.

In some embodiments, the device may further include: a releasing circuitry 45 configured to release the connection between the first service channel and the second service channel based on an instruction of the current subscriber; and a current subscriber calling circuitry 47 configured to set up a call between a current subscriber and the first or second remote subscriber, wherein the current subscriber identity card identifies the current subscriber.

In some embodiments, the device may further include a call setting up circuitry 44 configured to: before the first service channel and the second service channel are connected, set up a call with the second remote subscriber based on the second service channel.

In some embodiments, the call setting up circuitry 44 may be configured to determine the second remote subscriber based on a selection of the current subscriber.

In some embodiments, when the first service channel is connected with the second service channel, the third service channel may retain an activated state.

In some embodiments, the first, second and third service channels may perform service data transmission based on a data channel which is set up based on a wireless network.

In some embodiments, the data channel for the first, second and third service channels may be a data channel of an IMS network.

In some embodiments, the data channel of the IMS network may include a data channel corresponding to IMS PDN.

In some embodiments, the first, second and third service channels may correspond to different ports of the data channel. The different ports of the data channel may be different sockets.

Referring to FIG. 4, the device may further include: a releasing circuitry 45 configured to release the connection between the first service channel and the second service channel based on an instruction of the current subscriber; and a call switching circuitry 46 configured to connect the first service channel with a fourth service channel to set up a call between the first remote subscriber and a fourth remote subscriber through the first and fourth service channels, wherein the fourth service channel is set up based on the current subscriber identity card. In some embodiments, the device may be integrated in the mobile terminal, such as in a CPU of the mobile terminal, to implement solutions provided in the embodiments of the present disclosure.

It should be noted that, although the above embodiments are described by taking a single subscriber in a mobile terminal as an example, embodiments of the present disclosure is not limited thereto. That is, embodiments of the present disclosure are also adapted to a terminal of multi-subscribers, such as a terminal supporting multiple subscriber identity cards, as long as at least one subscriber of the multi-subscribers is capable of setting up multiple service channels.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A call transferring method for a multi-channel terminal, comprising:
   a current subscriber receiving an incoming call request from a first remote subscriber and setting up a call with the first remote subscriber based on a first service channel; and
   connecting the first service channel with a second service channel to forward service data of the first remote subscriber to a second remote subscriber and forward service data of the second remote subscriber to the first remote subscriber through the first and second service channels,
   wherein the first and second service channels are set up based on a current subscriber identity card, and prior to receiving the incoming call request from the first remote subscriber, the current subscriber is in a call with a third remote subscriber using a third service channel which is set up based on the current subscriber identity card which identifies the current subscriber.

2. The method according to claim 1, wherein when the first service channel is connected with the second service channel, the third service channel retains an activated state.

3. The method according to claim 1, further comprising:
   releasing the connection between the first service channel and the second service channel based on an instruction of the current subscriber; and
   setting up a call between a current subscriber and the first or second remote subscriber, wherein the current subscriber identity card identifies the current subscriber.

4. The method according to claim 1, wherein prior to connecting the first service channel with a second service channel, the method further comprises: setting up a call with the second remote subscriber based on the second service channel.

5. The method according to claim 4, wherein the second remote subscriber is determined based on a selection of the current subscriber.

6. The method according to claim 1, wherein the service is based on an IP Multimedia Subsystem (IMS) network.

7. The method according to claim 1, wherein the first, second and third service channels perform service data transmission based on a data channel which is set up based on a wireless network.

8. The method according to claim 7, wherein the data channel for the first, second and third service channels is a data channel of an IMS network.

9. The method according to claim 1, further comprising:
   releasing the connection between the first service channel and the second service channel based on an instruction of the current subscriber; and
   connecting the first service channel with a fourth service channel to set up a call between the first remote subscriber and a fourth remote subscriber through the first and fourth service channels, wherein the fourth service channel is set up based on the current subscriber identity card.

10. A call transferring device for a multi-channel terminal, being at a current subscriber and comprising:
    an incoming call request receiving circuitry configured to receive an incoming call request from a first remote subscriber and set up a call with the first remote subscriber based on a first service channel;
    a service channel connecting circuitry configured to connect the first service channel with a second service channel to forward service data of the first remote subscriber to a second remote subscriber and forward service data of the second remote subscriber to the first remote subscriber through the first and second service channels, wherein the first and second service channels are set up based on a current subscriber identity card; and
    a parallel calling circuitry configured to control the current subscriber to be in a call with a third remote subscriber using a third service channel, wherein the incoming call request receiving circuitry is configured to receive the incoming call request from the first remote subscriber when the current subscriber is in the call using the third service channel, and the third service channel is set up based on the current subscriber identity card which identifies the current subscriber.

11. The device according to claim 10, wherein when the first service channel is connected with the second service channel, the third service channel retains an activated state.

12. The device according to claim 10, further comprising:
a releasing circuitry configured to release the connection between the first service channel and the second service channel based on an instruction of the current subscriber; and
a current subscriber calling circuitry configured to set up a call between the current subscriber and the first or second remote subscriber, wherein the current subscriber identity card identifies the current subscriber.

13. The device according to claim 10, further comprising a call setting up circuitry configured to: before the first service channel and the second service channel are connected, set up a call with the second remote subscriber based on the second service channel.

14. The device according to claim 13, wherein the call setting up circuitry is configured to determine the second remote subscriber based on a selection of the current subscriber.

15. The device according to claim 10, wherein the service is based on an IP Multimedia Subsystem (IMS) network.

16. The device according to claim 10, wherein the first, second and third service channels perform service data transmission based on a data channel which is set up based on a wireless network.

17. The device according to claim 16, wherein the data channel for the first, second and third service channels is a data channel of an IMIS network.

18. The device according to claim 10, further comprising:
a releasing circuitry configured to release the connection between the first service channel and the second service channel based on an instruction of the current subscriber; and
a call switching circuitry configured to connect the first service channel with a fourth service channel to set up a call between the first remote subscriber and a fourth remote subscriber through the first and fourth service channels, wherein the fourth service channel is set up based on the current subscriber identity card.

* * * * *